United States Patent [19]

Legris

[11] Patent Number: 4,741,249

[45] Date of Patent: May 3, 1988

[54] AUTOMATIC ECONOMIZING DEVICE FOR COMPRESSED AIR

[75] Inventor: André Legris, Rennes, France

[73] Assignee: Societe Anonyme Styled Legris, Rennes Cedex, France

[21] Appl. No.: 691,562

[22] PCT Filed: Apr. 11, 1984

[86] PCT No.: PCT/FR84/00099

§ 371 Date: Dec. 11, 1984

§ 102(e) Date: Dec. 11, 1984

[87] PCT Pub. No.: WO84/04138

PCT Pub. Date: Oct. 25, 1984

[30] Foreign Application Priority Data

Apr. 12, 1983 [FR] France ............................ 83 05965

[51] Int. Cl.[4] ..................... F15B 11/08; F16K 17/06

[52] U.S. Cl. .................................. 91/443; 91/450; 91/454; 91/461; 91/463

[58] Field of Search ................ 91/454, 462, 463, 461, 91/398, 403, 450, 443

[56] References Cited

U.S. PATENT DOCUMENTS 2,858,840 11/1958 Wright ............................ 91/454 X
3,010,432 11/1961 Robra et al. ..................... 91/461 X
3,125,319 3/1964 Arbogast et al. ................ 91/461 X
3,566,747 3/1971 Frame .
4,416,187 11/1983 Nystrom ......................... 91/454 X
4,608,910 9/1986 Levenez et al. .

FOREIGN PATENT DOCUMENTS 8205042 9/1983 France .
8303513 9/1984 France .
2074701 4/1981 United Kingdom .

*Primary Examiner*—Edward K. Look
*Attorney, Agent, or Firm*—Marks, Murase & White

[57] ABSTRACT

Automatic device for economizing compressed air comprises a means for ensuring the passage of driving fluid under pressure during most of the stroke of the moving element of a user apparatus. The device consists of a single-unit body having a first circuit connecting a fluid supply pipe to one chamber of the cylinder actuator. The first circuit is controlled by a valve moving with a piston subjected to the action of an elastic means and slidably mounted in the body. The piston is actuated by the presence or absence of a pressure signal, the body having a second circuit by-passing the first circuit and connecting a fluid exhaust pipe to the cylinder chamber.

18 Claims, 5 Drawing Sheets

AUTOMATIC ECONOMIZING DEVICE FOR COMPRESSED AIR

BACKGROUND OF THE INVENTION

1. Field of the Invention

This invention relates to an automatic device for economizing compressed air.

2. Related Art

French Pat. No. 82 05 042 and its certificate of addition No. 83 03 513 cover a compressed air economizing device permitting the driving fluid pressure of a user-apparatus such as a cylinder actuator to be adjusted to a pressure lower than the pressure in the distribution network.

That device comprises a means of ensuring passage of the fluid under pressure during most of the stroke of the cylinder's moving element and blocks passage of the pressurized fluid before or at the end of the stroke of said moving element.

The certificate of addition, No. 83 03 513, describes such an economizing device constructed in the form of a single-unit fitting readily mountable on a cylinder, a pipe or a directional valve, which can be built very simply and cost-effectively.

OBJECTS AND SUMMARY OF THE INVENTION

The present invention is directed to an improved economizing device of the same type incorporated in a single-unit fitting designed to equip only one chamber of a double-acting cylinder.

The invention accordingly provides a device consisting of a fitting having a first circuit connecting a fluid supply pipe to a cylinder chamber. The first circuit is controlled by a valve which moves with a piston slidably driven by an elastic means within the fitting. The piston is actuated by the presence or absence of a pressure signal. The fitting has a second circuit short-circuiting the first circuit and connecting a fluid exhaust pipe to the cylinder chamber. The second circuit is controlled by a check valve and the top of the fitting is provided with a means for adjusting the tension of the elastic means and pursuant, the speed of the cylinder's moving element.

This device permits stopping the supplying of fluid to the cylinder before, or at, the end of the piston stroke and also permits adjusting the speed of the piston to suit the work required.

Control of the check valve is obtained either by the drop in pressure of the exhaust fluid or by a pressure signal generated by an end-of-travel detector in the cylinder.

BRIEF DESCRIPTION OF THE DRAWINGS

Other features and advantages of the invention will be more readily understood in reading the following description of several embodiments with reference to the appended drawings in which.

DETAILED DESCRIPTION OF THE PREFERRED EMBODIMENTS

Figure 1:
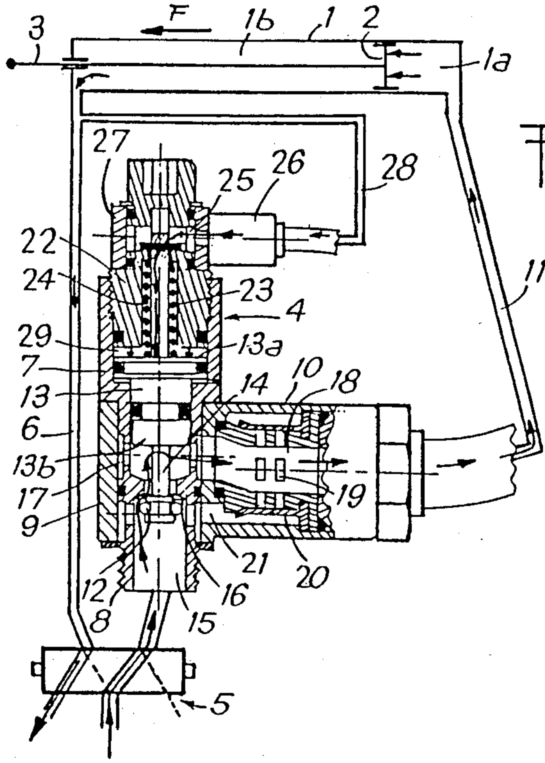
FIG. 1 is a cutaway view, taken longitudinally, of a single-unit economizing device of the pressure drop type, connected to one end of a cylinder actuator.

FIG. 1 shows a cylinder actuator 1 in which is slidably mounted a piston 2 consisting of a rod 3 driving any suitable unit not shown in the drawing. A compressed air economizing device 4 is fitted between one of the chambers 1*a* of the cylinder and a directional valve 5 operable to alternatively connect chamber 1*a* to a compressed air source or to the atmosphere. The other chamber 1*b* of the cylinder is connected directly via a pipe 6 to the directional valve 5, although it would be possible to also equip the pipe 6 with an economizing device identical to economizing device 4.

The economizing device 4 consists of a tubular body 7, having a threaded bottom portion 8 for screwing into the tapped port of a supporting means and a cylindrical portion on which is fitted a collar 9 with a pipe connection 10 for fluid flow to pipe 11 and chamber 1*a* of the cylinder, said connection 10 extending at a right angle to the axis of body 7.

The body 7 of the device incorporates a valve 12 connected to a piston 13 via a stem 14 and operable to close off the passage between duct 15 and the opening of connection 10 when pushed against a valve seat 16 provided in the body 7. A tubular space above seat 16 communicates via openings 17 provided therein with a flow channel 18 in pipe connection 10 leading to pipe 11.

Flow channel 18 is provided with slots 19 which are closed off on the outside of said channel by a flexible sleeve 20 which is attached at one end and free to open at the other end to allow fluid to pass from pipes 11 and 18 in the direction of a tubular section 21 issuing into duct 15 to bypass the seat 16 of valve 12. This sleeve 20 forms a check valve enabling the fluid to pass only in the direction from chamber 1*a* to directional valve 5.

The top of body 7 has a threaded section mating with a plug 22, said plug having a center cavity 24 housing a spring 23 which pushes against the larger cross-sectional side of piston 13 such that the compression of spring 23 is adjusted in relation to the piston and the valve 12 to adjust the flow rate of the fluid and the speed of piston 2. Cavity 24 extends toward the top of plug 22 and opens, via openings 25, into a pipe connection 26 being part of a collar 27 fitted externally onto the top part of plug 22 and extending at a right angle to the axis of body 7.

Pipe connection 26 connects via pressure tap pipe 28 to the fluid outlet 6 of cylinder 1 chamber 1*b*.

When the cylinder piston 2 moves in the direction of arrow F in FIG. 1, the fluid escaping through pipe 6 transfers its pressure through pipe 28 to chamber 29 located above piston 13 such that the large face 13*a* of piston 13 is subjected to the combined pressure of the spring 23 and the exhaust fluid from cylinder chamber 1*b*. The small face 13*b* of piston 13 is subjected to the pressure action of the intake or driving fluid. Consequently, valve 12 moves to open position, allowing the driving fluid to pass through pipes 18 and 11 and into chamber 1*a*.

However, as soon as piston 2 reaches the end of its stroke, the exhaust fluid pressure disappears and no longer acts on the large face 13*a* of piston 13. Consequently, valve 12 closes due to the force of the driving fluid on the small face 13*b* of piston 13, said force being greater than that of the spring 23.

Lacking pressure in chamber 17, on the other hand, valve 12 returns to open position, pushed by spring 23.

When the cylinder piston 2 travels opposite the direction of arrow F and chamber 1*a* is in exhaust position, fluid flows out through pipe 11 to pipe 18 and pushes the small face 13*b* of piston 13 while the large face 13*a* of the piston is subjected to the action of the driving fluid and the spring which keep the valve 12 open.

Moreover, the fluid can escape into the annular space 21 and duct 15 toward the directional valve 5, by passing through the check valve 20, thus boosting the exhaust flow.

The speed of piston 2 can be varied by acting upon plug 22, screwing the plug in or out to change the tension on spring 23 and the fluid passage between seat 16 and valve 12.

Figure 2:
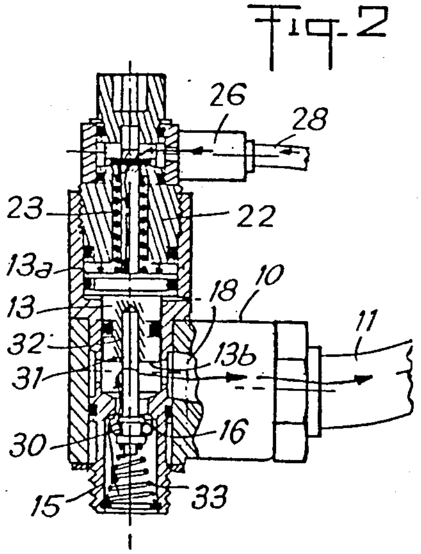
FIG. 2 is a cutaway view of an economizing device identical to that of FIG. 1 and comprising only one valve operating in both directions.

FIG. 2 shows an economizing device identical to that of FIG. 1, except that in this embodiment, a valve is used which by itself ensures passage of the fluid on intake and exhaust.

To this end, valve 30 has a stem 31 adapted to slide in a blind hole 32 formed in the bottom of piston 13, said valve 30 being subjected to the action of a spring 33 acting in the direction of closure of valve 30.

Pipe connection 10 has only 1 channel 18 and the check valve 20 shown in FIG. 1 has been eliminated. When cylinder chamber 1*a* is supplied with driving fluid such that the exhaust fluid flows out of cylinder chamber 1*b*, the piston 13 is held in down by spring 23 in combination with the pressure of the exhaust fluid leaving pipe 28, so that valve 30 stays open and allows passage of the driving fluid into pipe 11.

As soon as the exhaust fluid pressure lets off on the large face 13*a* of piston 13, piston 13 moves up in response to the pressure acting on its small face 13*b*, thus allowing valve 30 to close against the seat 16 due to the pressure of spring 33.

Nevertheless, when the exhaust fluid flows the opposite way, through pipe 11 towards duct 15, valve 30 being independent of piston 13, this results in spring 33 being compressed by the fluid pressure and enabling valve 30 to open and the fluid to escape into duct 15.

Adjustment of the speed of piston 2 is done in the same way as above by acting on plug 22 and compressing spring 23 to a greater or lesser extent to allow a larger or smaller passage between the valve 30 and its seat 16.

Figure 3:
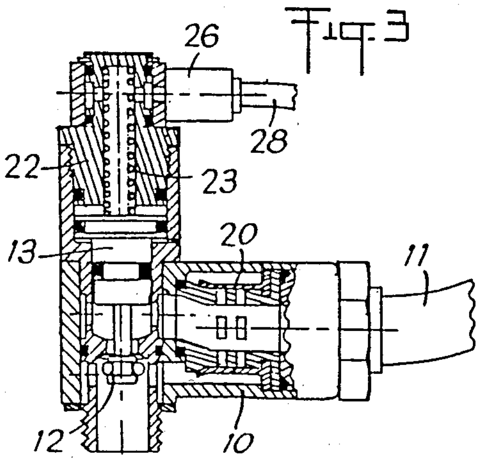
FIG. 3 is a cutaway view of an alternative embodiment of the device in FIG. 1.

FIG. 3 shows an economizing device analogous to that of FIG. 1, except that the plug 22 is fixed and cannot serve as a means of adjusting the tension of spring 23 as in FIG. 1 to control the fluid flow opening and the travel speed of piston 2 in the cylinder.

Figure 4:
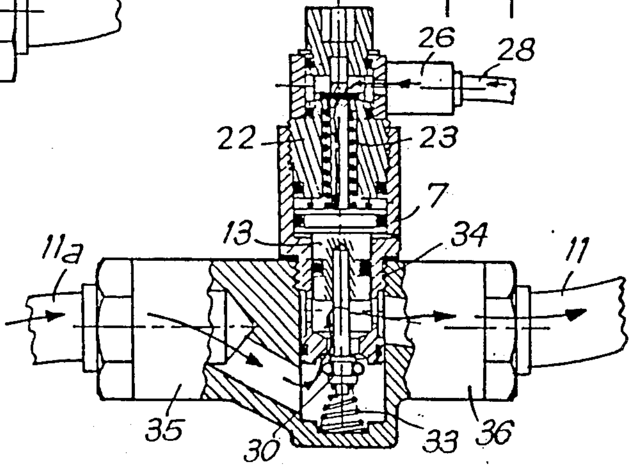
FIG. 4 is a cutaway view of an economizing device with axially aligned pipes.

In the embodiment depicted in FIG. 4, the device comprises a main body 7 having a threaded part 34 at its base engaged into a tapped hole in a secondary body consisting of 2 pipe connections—fluid inlet 35 and outlet 36—which are axially aligned with one another at a right angle to the axis of the main body 7.

This provides a direct passage for the fluid due to the fact that the device can be fitted to a line 11, 11*a* connected on one side to the cylinder and on the other side to the directional valve.

The control means for valve 30 is identical to that which was the object of the embodiment of FIG. 2.

Figure 5:
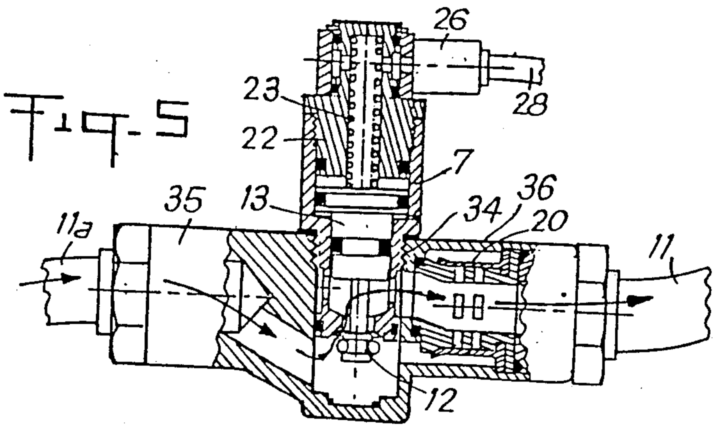
FIG. 5 is a cutaway view of an alternative embodiment of the device in FIG. 4.

The economizing device illustrated in FIG. 5 is the same as the one of FIG. 3, except that, like the previous one, it includes a secondary body consisting of two pipe connections 35, 36 axially aligned with one another. The control means for valve 12 and the check valve 20 are the same as those featured in FIG. 3, which lack means for adjusting the tension of spring 23.

Figure 6:
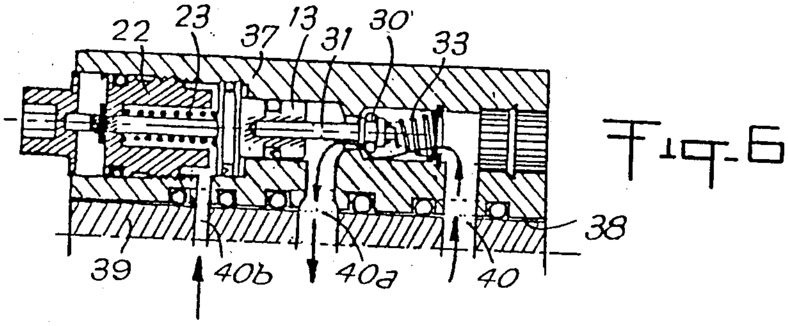
FIG. 6 is a cutaway view of an economizing device fitted to an apparatus and specifically to a directional valve.

FIG. 6 shows an economizing device comprising a body 37 with a flat surface 38 through which it is attached to a corresponding surface of an apparatus, in particular a directional valve 30 having ports 40, 40*a* and 40*b* aligned with the intake and exhaust ports of the economizing device.

Valve 30 is controlled by a piston 13 in the same way as described above for the device in FIG. 2.

Figure 7:
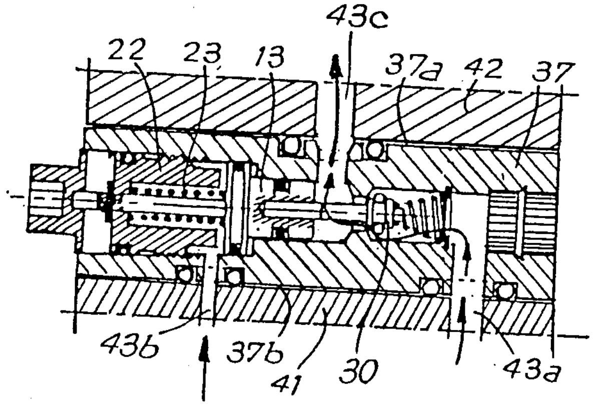
FIG. 7 is a cutaway view of an economizing device sandwiched between two apparatuses.

FIG. 7 shows a device identical to that of FIG. 6, except that it is sandwiched between two apparatuses 41 and 42. To this effect the body 37 of the device is given two flat surfaces 37*a*, 37*b* which apply to corresponding surfaces on the two apparatuses.

Ports 43*a*, *b* and *c* of the apparatuses are in direct communication with the ports of the economizing device body 37.

Figure 8:
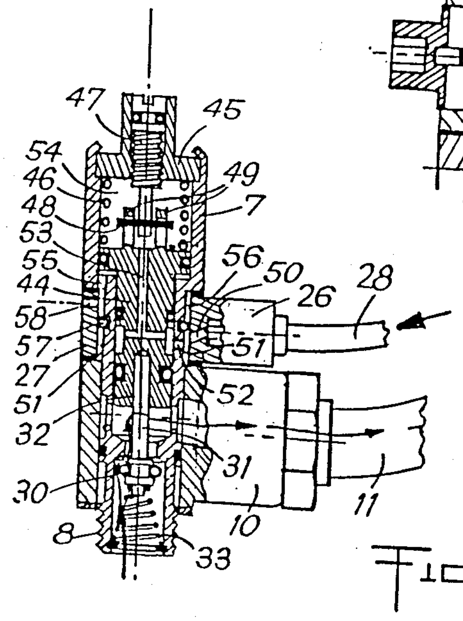
FIG. 8 is a cutaway view of an economizing device wherein the piston contains a passage for the exhaust fluid.

FIG. 8 shows an economizing device wherein the body 7 contains a piston 44 having a blind hole 32 in which is slidably mounted the stem 31 of valve 30.

The top of body 7 is closed off by a plug 45 against which presses one end of a spring 46 whose other end presses against a piston 44. A tapped hole is provided in plug 45 for receiving a screw 47 having an end pin 48 bearing on members 49 attached to piston 44.

This feature enables compression adjustment of spring 46 by adjusting the screw 47 and piston 44 in order to adjust the air output and, following, the speed of cylinder piston 2.

Above pipe connection 10, body 7 is fitted with a collar 27 and pipe connection 26 connected via pipe 28 to the exhaust of cylinder chamber 1*b*. Pipe connection 26 has a slanted duct 50 issuing into an annular space 51 communicating via an aperture 52 in body 7 and a center bore 53 in piston 44 with an chamber 54 located above piston 44.

The part of chamber 54 which is located under the piston is vented to the atmosphere via a duct 55 in body 7, an annular space 56 separated from annular space 51 by an O-ring 57, an an aperture 58 arranged in collar 27.

This device operates in the same way as the one described with reference to FIG. 2, except that the fluid from the exhausting chamber comes in above the piston after flowing through said piston's center bore 53.

Figure 9:
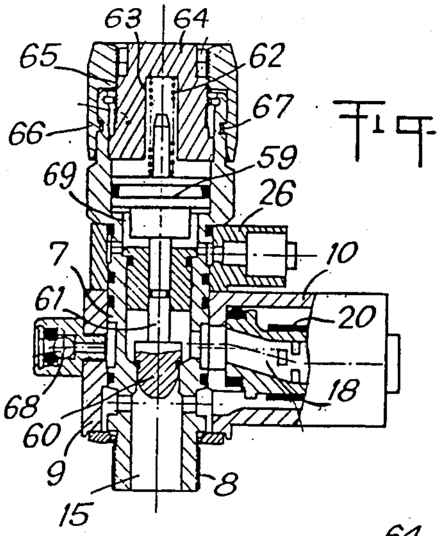
FIG. 9 is a cutaway view of an economizing device containing a normally-closed valve actuated by pressure drop.

FIG. 9 shows a device having a piston 59 connected to a valve 60 by means of a stem 61, said valve being held in its seat, in closed position, by a spring 62 housed in a compartment 63 provided in a plug 64 engaged in body 7 and having a threaded portion 65, said latter portion mating with a tapped hole in a collar 66 mounted rotatively but captively, due to a rib 67 engaged in a groove in body 7.

This feature makes it possible to axially move plug 64 by turning collar 66, so as to adjust the compression of spring 62 for purposes of adjusting fluid flow and the speed of the cylinder piston.

Collar 9 is provided with a ball check valve 68 making it possible to vent the space above valve 60.

When chamber 1*a* of the cylinder (FIG. 1) is supplied with fluid, valve 60 is in open position, piston 59 being pushed up against spring 62 by the pressure of the fluid exhausting from chamber 1*b* of the cylinder, which enters chamber 69 through pipe connection 26.

As soon as the pressure of the exhaust fluid disappears, as the piston 2 of the cylinder 1 reaches the end of its stroke, piston 59 returns to its initial position by the action of spring 62 and valve 60 closes.

Check valve 20 enables bypassing of valve 60 to allow fluid to pass in reverse when cylinder chamber 1*a* is in the exhausting phase.

Figure 10:
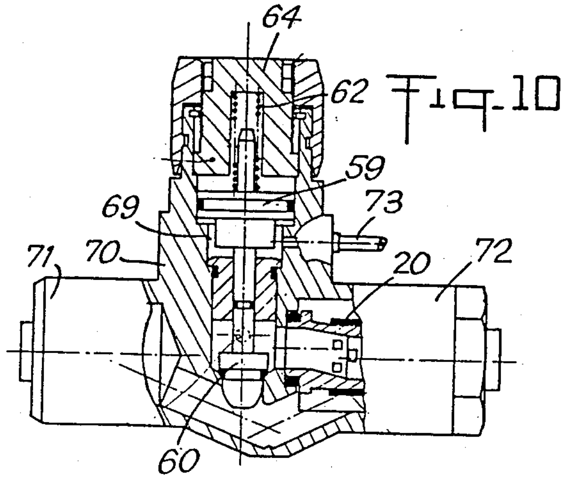
FIG. 10 is a cutaway view of a variant of FIG. 9.

The device illustrated in FIG. 10 is analogous to that of FIG. 9 except for the body 70 which comes in a single unit and has two pipe connections 71, 72 which are axially aligned with one another for insertion into a pipeline.

Moreover, connection with the fluid exhaust line is made via a pipe 73 issuing into chamber 69 of body 70.

Figure 11:
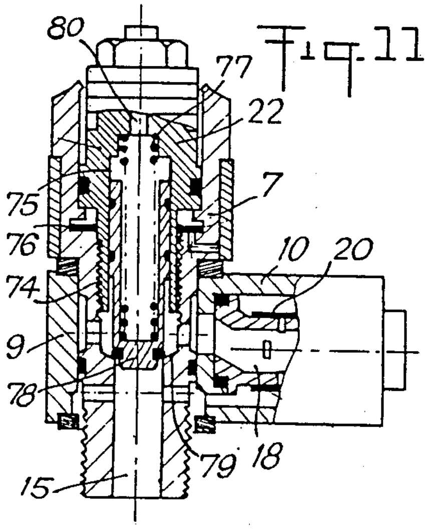
FIG. 11 is a cutaway view of an economizing device with a normally-closed valve actuated by a pressure signal.

FIG. 11 shows another embodiment of an economizing device whose valve is controlled to close by a pressure signal sent by an end-of-stroke detector on piston 2 of cylinder 1 or by any other suitable means providing a pressure signal.

This device includes a plug 22 with a threaded part 74 screwed into body 7, on which body is mounted at a right angle, by means of a collar 9, a pipe connection 10 containing a check valve 20. Plug 22 contains a cavity 75 in which is slidably mounted a piston 76 spring loaded by spring 77 and fitted with a closing member 78 on one of its ends forming the valve which closes against a seat 79 provided in the body between ducts 15 and 18.

The top of plug 22 is provided with a bore hole 80 connected to a pressure signal means,in particular to signal the end of the stroke of the cylinder piston.

When driving fluid is applied to the base of valve 78 said valve is pushed against the force of spring 77 and opens to allow the fluid to flow out through duct 18 and cylinder chamber 1*a*. If at a given time a pressure signal is sent via borehole 80 into cavity 75, the pressurized fluid, together with spring 77, act on piston 76, closing valve 78, which applies against the seat 79, thus cutting off the flow of driving fluid.

Figure 12:
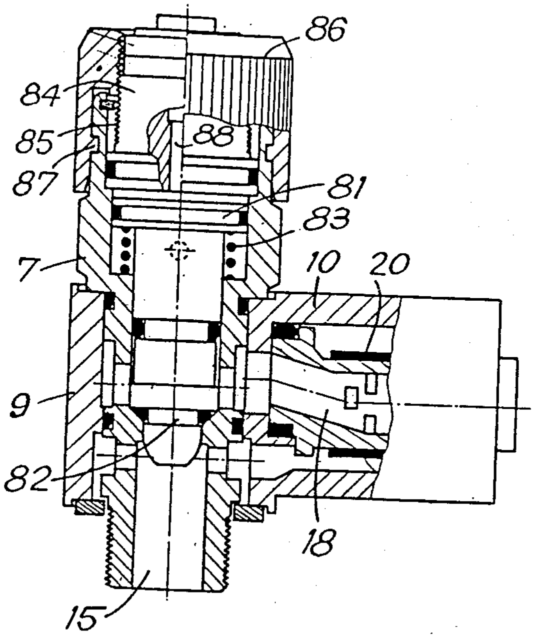
FIG. 12 is a cutaway view of an economizing device with a normally-closed valve actuated by a pressure signal.

FIG. 12 shows an economizing device having a valve controlled by a pressure signal. A piston 81 and valve 82 unit is fitted in the body 7 such that the valve is kept open by a spring 83.

The top of body 7 is provided with a plug 84 having a threaded part 85 by which it engages in a tapped hole in an adjusting ring 86 having a circular rib 87 mating with a groove in body 7, said ring thus being rotatably maintained on body 7. This feature enables adjustment of valve 82 in relation to its seat when it is opened and, following, adjustment of the rate of fluid flow and of the speed of cylinder piston 2.

The top part of plug 84 has a center bore 88 enabling transmission of a pressure signal to piston 81 to close valve 82 against the action of spring 83 at a predetermined time, particularly when the cylinder is at the end of its stroke.

Figure 13:
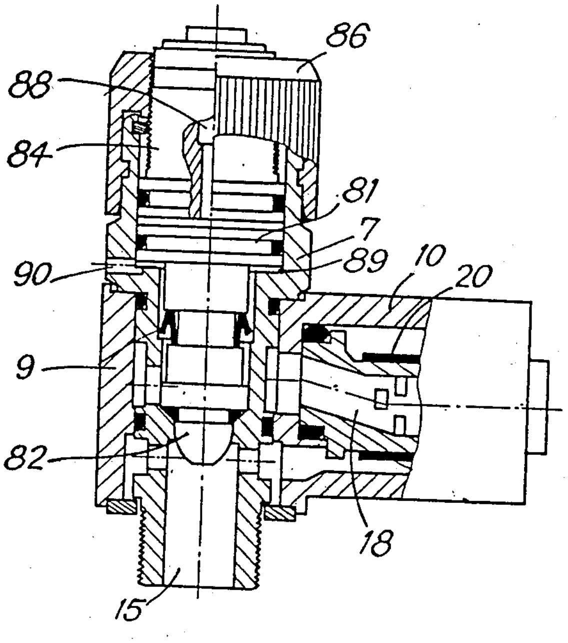
FIG. 13 is a cutaway view of a variant of the device shown in FIG. 12.

FIG. 13 shows a device like that of FIG. 12, except that it lacks a spring 83, due to the face that the chamber 89 is vented to the atmosphere via a duct 90.

Figure 14:
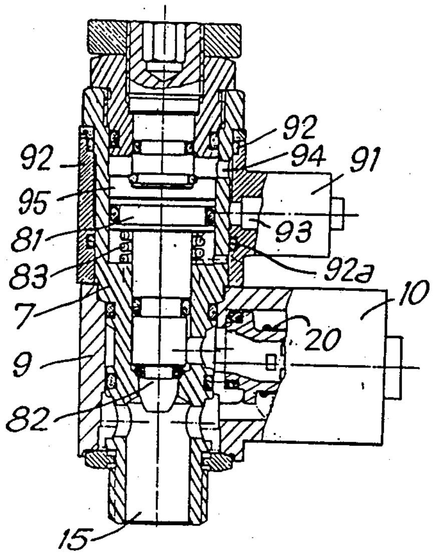
FIG. 14 is a cutaway view of an economizing device with a normally-open valve actuated sideways by a pressure signal.

FIG. 14 shows a device similar to that of FIG. 12 wherein the pressure signal however enters laterally.

To this effect, the device is provided with another pipe connection 91 above pipe connection 10, said connection 91 comprising a collar 92 fitted to body 7 and provided with seals 92*a* and 92*b* for the purpose of isolating an annular space between the body 7 and the collar 92, said annular space connecting pipe 93 via an aperture 94 to a chamber 95 located above piston 81.

The pressurized fluid corresponding to a signal can thus propagate from pipe 93 to chamber 95 wherein it acts upon the piston 81 and against the action of spring 83 and closes normally-open valve 82.

Figure 15:
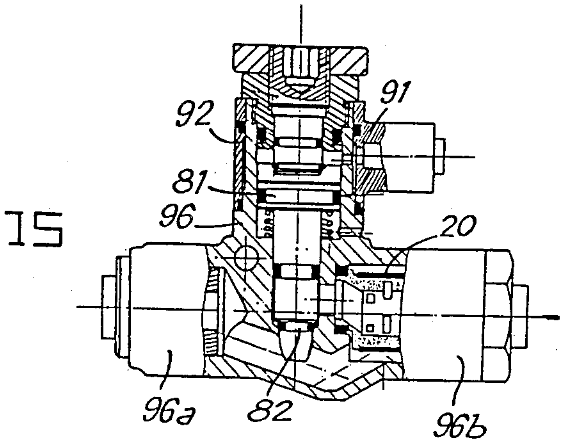
FIG. 15 is a cutaway view of a variant of the device shown in FIG. 14, with axially aligned ports.

The device shown in FIG. 15 is the same as that of FIG. 14, except for the arrangement of body 96 which has two pipe connections 96*a* and 96*b* axially aligned with one another, said pipe connections ensuring the flow of fluid in one direction by valve 82 or in the other direction by means of check valve 20.

Figure 16:
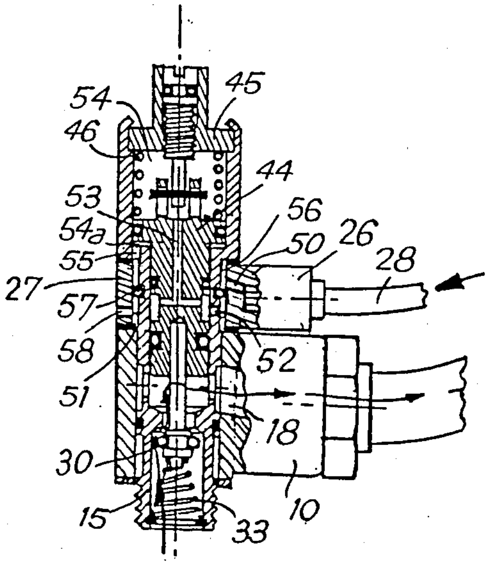
FIG. 16 is a cutaway view of a variant of the device shown in FIG. 8, actuated by a pressure signal.

The device shown in FIG. 16 is the same as that of FIG. 8, except that it is used in the case of a piston operated by a pressure signal.

To this effect, collar 27 is flipped over so that the slanted duct 50 issues into annular space 56 and, via aperture 55, into chamber 54*a* under piston 44. Also, as space 51 is vented to the atmosphere via the aperture 58 in collar 27, it is possible to vent space 54 via center bore 53, which issues into annular space 51.

When a pressure signal is fed through pipe 28, duct 50, space 52 and aperture 55 to chamber 54*a*, piston 44 moves up against spring 46 such that valve 30 is pushed up by spring 33 to close off the passage between ducts 15 and 18.

The invention is not limited to the embodiments shown and a person ordinarily skilled in the art may make some modifications to it without departing from the scope of the invention.

I claim:

1. An economizing device for supplying pressurized fluid to an apparatus having first and second expandable chambers separated by a moveable element having a stroke length, said economizing device being operable for supplying pressurized fluid to said first chamber during most of said stroke length, and for blocking passage of said pressurized fluid to said first chamber near the end of said stroke length, and comprising:

a first fluid circuit disposed between said apparatus and a source of pressurized fluid for connecting the source of pressurized fluid to said first chamber, said first fluid circuit including a valve having a valve outlet and a piston means for actuating said valve, said valve and said piston means being disposed in a cylinder, said valve being operable for closing and opening said first fluid circuit;

a second fluid circuit terminating generally at said valve outlet and including an exhaust pipe, said second fluid circuit bypassing at least a portion of said first fluid circuit and being operable to connect said first chamber to said exhaust pipe;

a means for adjusting an opening of said valve; and

2. The economizing device according to claim 1 further comprising a fitting body which includes said first and second fluid circuits.

3. The economizing device according to claim 2 wherein said fitting body further includes said means for adjusting.

4. The device as set forth in claim 2, wherein said body includes a threaded bottom tube for passage of fluid into said body, said body further comprising a first collar having a first pipe connection for communicating between the first chamber and a fluid flow aperture in said body, said body further comprising a second collar having a second pipe connection for communicating between said cylinder and a pressure signal tap, said pipe connections issuing being disposed essentially at right angles to the axis of said body.

5. The device as set forth in claim 2, wherein said body includes a threaded bottom tube for passage of fluid into said body, said body further comprising a collar having a pipe connection for communicating between the first chamber and a fluid flow aperture in said body, said body being closed at the top thereof by a plug having a borehole, said borehole being coaxial with the body and connecting a chamber above the piston with a fluid pressure signal tap.

6. The device as set forth in claim 2, wherein said body has first and second axially aligned passages, fitted with first and second pipe connections respectively for direct passage of fluid, said first and second pipe connections at least providing a through channel having an opening controlled by the valve, said body further comprising a collar having a third pipe connection enabling for communicating between said cylinder and a pressure signal tap, said third pipe connection being disposed at essentially a a right angle to the axis of said body.

7. The device according to claim 4 or claim 5 or claim 6 wherein one of the pipe connections has a check valve therein.

8. The device according to claim 2 wherein said biasing means comprises a spring and wherein said valve is normally open under the influence of said spring, said valve being attached to said piston by a stem, said piston being slidably mounted in said cylinder and having a larger face and a smaller face, said piston being subjected to the combined action of said spring and the fluid pressure of said second chamber on the larger face and to the action of the pressurized fluid on the smaller face.

9. The device according to claim 2 further comprising a biasing means in the form of a spring and wherein said valve is normally open under the influence of said spring and is operable to control the passage of the pressurized fluid and of exhaust fluid from said second chamber, said valve having a stem slidably mounted in a blind hole of said piston having a first and a second face, said first face being larger than said second face wherein said first face is the larger of whose faces subjected to the combined action of said spring and the fluid pressure of the second chamber, and the second face is subjected to the action of the pressurized fluid.

10. The device according to claim 2 further comprising a biasing means in the form of a spring acting on a face of said piston and wherein said valve is held normally closed by said spring, the other face of said piston being adapted to be subjected to a fluid pressure from the second chamber.

11. The device according to claim 2 wherein said valve is a normally closed valve connected to a first face of said piston, the other face of said piston being subjected to the combined action of said biasing means and a pressure signal, the first face of said piston being subjected to said pressurized fluid.

12. The device according to claim 2 wherein said valve is a normally open valve held open by a biasing means acting on a first face of the piston means, the other face of the piston means being subjected to a pressure signal.

13. The device of claim 12 wherein said biasing means comprises a spring.

14. The device of claim 12 wherein said body further comprises a valve seat for seating said valve in its closed position and wherein said means for adjusting comprises a plug rotatably mounted on said body, said plug when rotated being operable to adjust said valve relative to said valve seat.

15. The device of claim 14 wherein said plug further comprises a bore for transmitting a pressure signal from said second chamber to said piston, said pressure signal being applied in a valve closing direction.

16. The device of claim 12 further comprising a chamber vented to the atmosphere on one side of said piston for supplying a valve opening force.

17. The device according to claim 2 or claim 9, wherein the fitting body is provided with a generally flat surface adapted to be placed in contact with a corresponding surface on said apparatus, said apparatus having ports adapted to align with ports in the fitting body.

18. The device according to claim 2 or claim 9, wherein the fitting body is disposed between a fluid directional valve on one side thereof and a base on another side thereof with which it is in contact through two of its sides, said base having channels for providing communication between ports disposed on said another side of said body and intake and exhaust lines of said apparatus, the one side of said body having ports being aligned with the ports of the directional valve.

* * * * *